(12) United States Patent
Hojjati

(10) Patent No.: US 12,603,788 B2
(45) Date of Patent: Apr. 14, 2026

(54) MANAGING HYGIENE OF KEY PAIRS BETWEEN CERTIFICATE AUTHORITIES USING FHE

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 211 days.

(21) Appl. No.: 18/343,091

(22) Filed: Jun. 28, 2023

(65) Prior Publication Data

US 2025/0007734 A1 Jan. 2, 2025

(51) Int. Cl.
H04L 9/32 (2006.01)
H04L 9/00 (2022.01)
H04L 9/08 (2006.01)

(52) U.S. Cl.
CPC ............ H04L 9/3268 (2013.01); H04L 9/008 (2013.01); H04L 9/0825 (2013.01); H04L 9/3247 (2013.01)

(58) Field of Classification Search
CPC ..... H04L 9/3268; H04L 9/008; H04L 9/0825; H04L 9/3247
See application file for complete search history.

(56) References Cited

U.S. PATENT DOCUMENTS

| | | | |
|---|---|---|---|
| 10,523,435 B2 | 12/2019 | Pilcher | |
| 10,630,489 B2 | 4/2020 | Hughes | |
| 10,764,040 B2 | 9/2020 | Kumar et al. | |
| 11,032,071 B2 | 6/2021 | Wang et al. | |
| 11,323,274 B1 * | 5/2022 | Bowen | H04L 9/3268 |
| 11,671,264 B1 * | 6/2023 | Cignetti | H04L 63/0823 |
| | | | 713/156 |
| 12,003,655 B1 * | 6/2024 | Slaughter | H04L 9/14 |
| 2017/0005805 A1 * | 1/2017 | Wang | H04L 9/3268 |
| 2018/0234257 A1 * | 8/2018 | Kommireddy | H04L 9/321 |
| 2018/0262339 A1 * | 9/2018 | Kazin | H04L 9/14 |
| 2018/0323977 A1 * | 11/2018 | Hojsik | H04L 67/12 |
| 2018/0352417 A1 * | 12/2018 | Butler | H04W 8/10 |
| 2019/0018951 A1 * | 1/2019 | James | H04L 61/3025 |
| 2019/0074982 A1 * | 3/2019 | Hughes | H04L 9/0863 |
| 2020/0259663 A1 * | 8/2020 | Firsov | H04L 9/30 |

(Continued)

FOREIGN PATENT DOCUMENTS

| | | |
|---|---|---|
| CN | 114070569 A | 2/2022 |
| CN | 114422138 A | 4/2022 |

(Continued)

*Primary Examiner* — Darshan I Dhruv
(74) *Attorney, Agent, or Firm* — Baratta Law PLLC; Lawrence A. Baratta, Jr.

(57) ABSTRACT

A method of issuing a digital certificate includes receiving a certificate signing request (CSR) from an entity; determining a public key of the entity from the CSR; applying encryption to the public key; checking whether a result of the encryption is in a database to determine whether the public key has been previously used; and responsive to the public key not having been previously used, issuing a certificate to the entity based on the public key and the CSR. The method can further include, responsive to the public key having been previously used, alerting the entity to resubmit the CSR with a public key that has not been previously used or inquiring from the entity whether to proceed to issuing the certificate despite previous use. The encryption can be fully homomorphic encryption (FHE).

14 Claims, 2 Drawing Sheets

(56)     References Cited

U.S. PATENT DOCUMENTS

| | | | |
|---|---|---|---|
| 2020/0280855 A1* | 9/2020 | Avetisov | H04L 63/20 |
| 2020/0396089 A1* | 12/2020 | Guo | H04L 63/123 |
| 2021/0258172 A1* | 8/2021 | Munoz Munoz | G06F 11/327 |
| 2022/0092168 A1 | 3/2022 | Brown et al. | |
| 2022/0343005 A1* | 10/2022 | Hanna | G06F 21/6245 |
| 2022/0353094 A1* | 11/2022 | Qiu | G06F 21/602 |
| 2023/0106024 A1* | 4/2023 | Keith, Jr. | G16H 40/63 |
| | | | 726/5 |
| 2023/0224293 A1* | 7/2023 | Rohlwing | H04L 63/0823 |
| | | | 713/156 |
| 2024/0031175 A1* | 1/2024 | Nebenzahl | H04L 9/3247 |

FOREIGN PATENT DOCUMENTS

| | | | |
|---|---|---|---|
| CN | 114611078 A | 6/2022 |
| KR | 102322447 B1 | 11/2021 |
| TW | 201929479 A | 7/2019 |
| WO | 2019096489 A1 | 5/2019 |
| WO | 2019096491 A1 | 5/2019 |
| WO | 2021021283 A1 | 2/2021 |

* cited by examiner

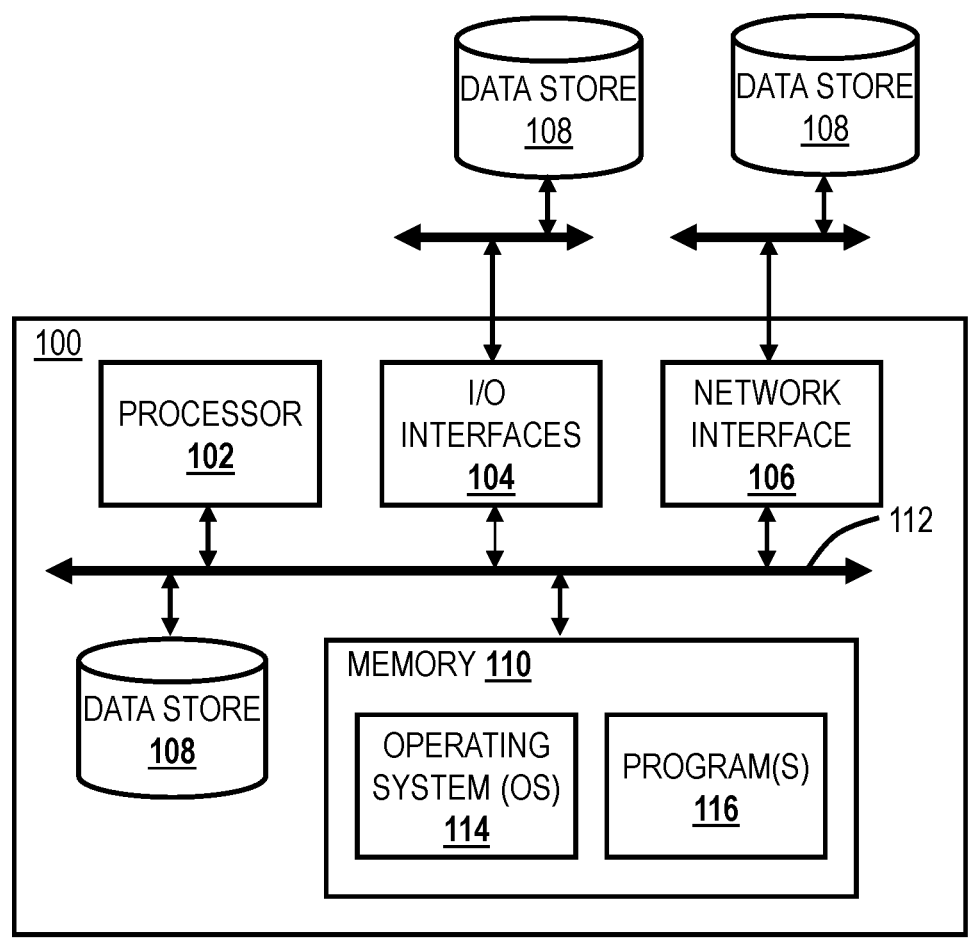
_FIG. 2_

MANAGING HYGIENE OF KEY PAIRS BETWEEN CERTIFICATE AUTHORITIES USING FHE

FIELD OF THE DISCLOSURE

The present disclosure relates generally to networking and computing. More particularly, the present disclosure relates to systems and methods for managing the hygiene of key pairs (i.e., public and private keys) between certificate authorities (CA) using fully homomorphic encryption (FHE).

BACKGROUND OF THE DISCLOSURE

In digital trust, key pairs are used for various purposes. Each key pair includes a public key and a corresponding private key. Key pairs are generated with cryptographic algorithms based on mathematical problems termed one-way functions. Security of public-key cryptography depends on keeping the private key secret; the public key can be openly distributed without compromising security. In a public-key encryption system, anyone with a public key can encrypt a message, yielding a ciphertext, but only those who know the corresponding private key can decrypt the ciphertext to obtain the original message.

A public key certificate, also known as a digital certificate or identity certificate (referred to herein as "certificate"), is an electronic document used to prove the validity of a public key. The certificate includes information about the key, information about the identity of its owner (called the subject), and the digital signature of an entity that has verified the certificate's contents (called the issuer). If the signature is valid, and the software examining the certificate trusts the issuer, then it can use that key to communicate securely with the certificate's subject. In a typical public-key infrastructure (PKI) scheme, the certificate issuer is a certificate authority (CA), usually a company that charges customers to issue certificates for them. The most common format for public key certificates is defined by ITU X.509, Information technology—Open Systems Interconnection—The Directory: Public-key and attribute certificate frameworks, October 2019, the contents of which are incorporated by reference in their entirety.

BRIEF SUMMARY OF THE DISCLOSURE

The present disclosure relates to systems and methods for managing the hygiene of key pairs (i.e., public and private keys) between certificate authorities (CA) using fully homomorphic encryption (FHE). As described herein, hygiene means that each certificate should have a unique (or at least a few) key pairs associated with it. Using the same key pair in order to acquire a certificate from a publicly trusted CA is an issue that has been around for a very long time. Disadvantageously, using the same key pair means comprising one private key can compromise all corresponding certificates. Also, some entities may use the same key pair across multiple different CAs. Currently there is no proactive technique between different CAs where they can flag a CSR (which holds the public key) which holds the same keypair that has been used to acquire a certificate from another CA. As such, the present disclosure provides techniques to ensure the hygiene of key pairs between different Cas. This includes indirect communication between different CAs, via certificate transparency (CT) logs, to agree that a public key has not been previously used to acquire a certificate while utilizing privacy preserving techniques (i.e., FHE) to mask the query which includes the public key while checking the CT logs.

In various embodiments, the present disclosure includes a method having steps, a non-transitory computer-readable medium storing instructions that, when executed, cause one or more processors to execute the steps, a processing device configured to implement the steps, a cloud service configured to implement the steps, etc. The steps include receiving a certificate signing request (CSR) from an entity; determining a public key of the entity from the CSR; applying encryption to the public key; checking whether a result of the encryption is in a database to determine whether the public key has been previously used; and, responsive to the public key not having been previously used, issuing a certificate to the entity based on the public key and the CSR.

The steps can further include, responsive to the public key having been previously used, alerting the entity to resubmit the CSR with a public key that has not been previously used. The steps can further include, responsive to the public key having been previously used, inquiring from the entity whether to proceed to issuing the certificate despite previous use. The steps can further include, responsive to the public key not having been previously used, entering a hash of the encryption in the database to denote previous use of the public key based on the issued certificate. The encryption can be fully homomorphic encryption.

The steps can further include determining the CSR is for a public hierarchy; and, responsive to the public hierarchy, checking whether the public key is in the database to determine whether the public key has been previously used. The steps further include determining the CSR is for a private hierarchy; and, responsive to the private hierarchy, checking whether the result of the encryption is in the database to determine whether the public key has been previously used. The database can be a certificate transparency (CT) log that is checked and updated by a plurality of certificate authorities including a certificate authority implementing the method. The CT log can include entries for both full public keys and encrypted public keys for anonymization purposes. The CT log can include entries for only encrypted public keys for anonymization purposes.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a processing system, which may implement the certificate signing process of FIG. 1.

DETAILED DESCRIPTION OF THE DISCLOSURE

Figure 1:
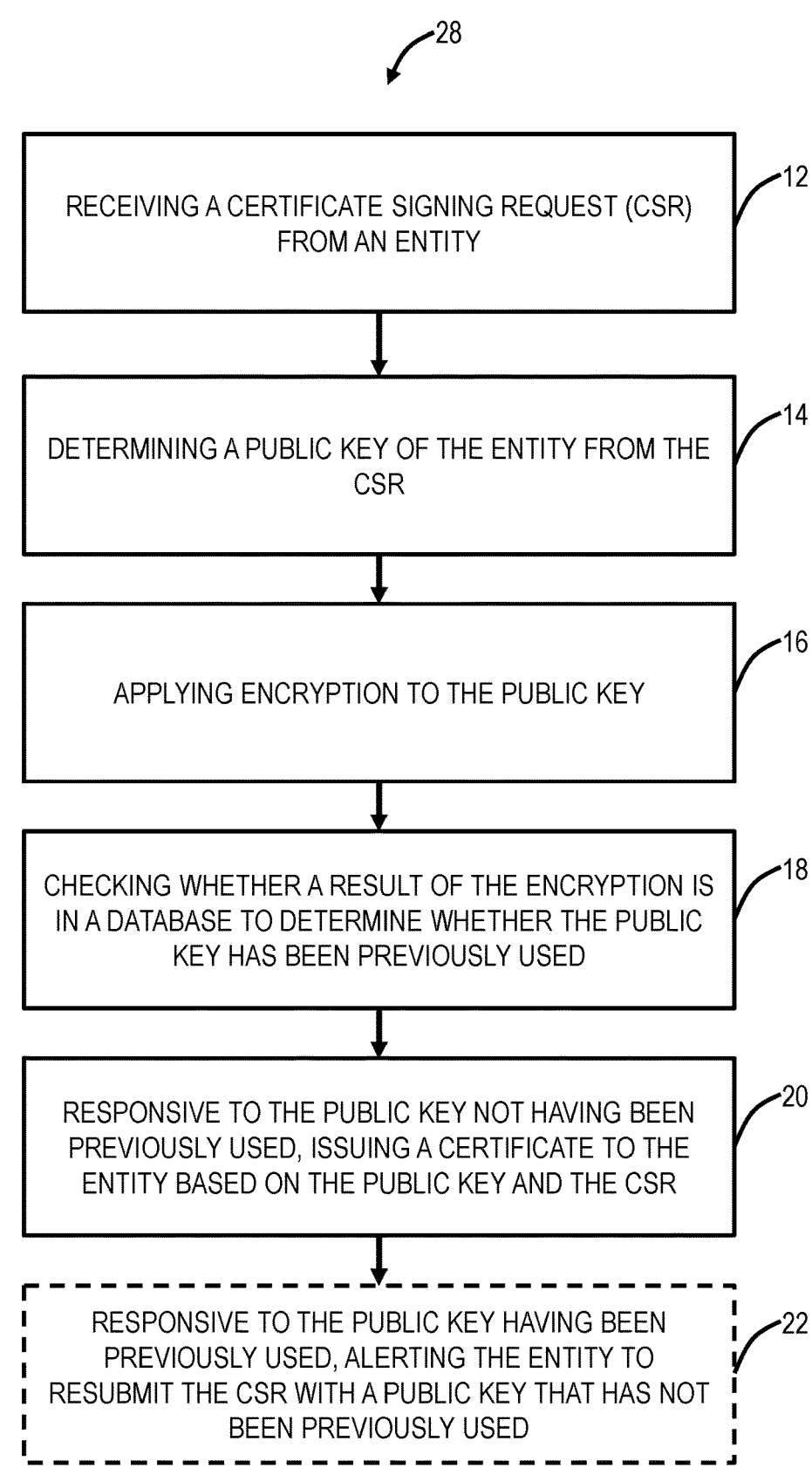
FIG. 1 is a flowchart of a certificate signing process, implemented by a certificate authority.

Again, the present disclosure relates to systems and methods for managing the hygiene of key pairs (i.e., public and private keys) between certificate authorities (CA) using fully homomorphic encryption (FHE). The present disclosure provides techniques to ensure the hygiene of key pairs between different CAs. This includes indirect communication between different CAs, via certificate transparency (CT) logs, to agree that a public key has not been previously used to acquire a certificate while utilizing privacy preserving techniques (i.e., FHE) to mask the query which includes the public key while checking the CT logs.

Certificate

Again, the present disclosure utilizes the term "certificate" to refer to a public key certificate, a digital certificate, an identity certificate, or the like. A certificate is useful for identity verification and encryption (secure communications). In email encryption, code signing, and e-signature systems, a certificate's subject is typically a person or organization. However, in Transport Layer Security (TLS) a certificate's subject is typically a computer or other device, though TLS certificates may identify organizations or individuals in addition to their core role in identifying devices. TLS, sometimes called by its older name Secure Sockets Layer (SSL), is part of Hypertext Transfer Protocol—Secure (HTTPS).

An X.509 certificate binds an identity to a public key using a digital signature. A certificate contains an identity (a hostname, or an organization, or an individual) and a public key (e.g., RSA, DSA, ECDSA, ed25519, etc.), and is signed by a certificate authority. X.509 also defines certificate revocation lists, which are a means to distribute information about certificates that have been deemed invalid by a signing authority, as well as a certification path validation algorithm, which allows for certificates to be signed by intermediate CA certificates, which are, in turn, signed by other certificates, eventually reaching a trust anchor.

When a certificate is signed by a trusted certificate authority, or validated by other means, someone holding that certificate can use the public key it contains to establish secure communications with another party, or validate documents digitally signed by the corresponding private key.

Certificate Signing Process

FIG. 1 is a flowchart of a certificate signing process 10, implemented by a certificate authority. The process 10 contemplates implementation as a method having steps, via a processing device configured to implement the steps, via the cloud which can include one or more processing device, and via a non-transitory computer-readable medium storing instructions that, when executed, cause one or more processors to execute the steps. The process 10 is described from the perspective of a certificate authority. Again, a certificate authority is an entity that stores, signs, and issues digital certificates. This allows others (relying parties) to rely upon signatures or on assertions made about the private key that corresponds to the certified public key. A CA acts as a trusted third party—trusted both by the subject (owner) of the certificate and by the party relying upon the certificate.

The process 10 includes receiving a certificate signing request (CSR) from an entity (step 12). To obtain a certificate, an entity (user, company, organization, etc.) submits a certificate signing request (CSR) to the CA. The CSR can be an encoded file that provides a standardized way to send a public key as well as some information that identifies entity, domain name, etc. For example, for a CSR, most server software asks for the following information: common name (e.g., www.example.com), organization name and location (country, state/province, city/town), key type (typically RSA), and key size (2048-bit minimum).

Next, the process 10 includes determining a public key of the entity from the CSR (step 14). The public key is part of the CSR. The public key is part of a public/private key pair. Again, key pairs are generated with cryptographic algorithms based on mathematical problems termed one-way functions. Security of public-key cryptography depends on keeping the private key secret; the public key can be openly distributed without compromising security. It is desirable for security to generate a new key pair for each certificate. As described herein, this often is not the case. As such, there is a risk that compromising a private key could compromise a number of certificates. This is critical for the vast majority of applications for certificates.

As such, there has been approaches to ensure public keys are not reused. One such approach has been certificate transparency (CT) logs (described in detail below). This provides a database where it is possible to check public keys associated with previously issued certificates with the objective being to avoid reuse of public keys. However, this approach with CT logs relies on publicly disclosing public keys. There are large number of certificates that are part of a so-called private hierarchy such as where certificates are installed on devices, e.g., Internet of Things (IoT) devices, user devices, etc. This is in contrast to a so-called public hierarchy where certificates such as where certificates are installed on servers, websites, etc. In the case of the public hierarchy, the public key is publicly available to view, e.g., via any standard browser. Conversely, in the case of the private hierarchy, the public key is not publicly accessible; rather, it is only available on the device.

Disadvantageously, certificate authorities do not log public keys for certificates issued in the private hierarchy. Generally, this is to preserve privacy of the entity associated with the certificates issued in the private hierarchy. This represents a large problem in the CT log approach. To address this issued, the present disclosure contemplates expanding the CT log approach to include the certificates issued in the private hierarchy in a manner that preserves privacy.

The process 10 includes applying encryption to the public key (step 16). Here, a predetermined one-way function is applied to the public key. As is known in the art, a one-way function is one that is easy to compute on every input, but hard to invert given the image of a random input. Here, "easy" and "hard" are to be understood in the sense of computational complexity theory, specifically the theory of polynomial time problems. An example of the encryption can be homomorphic including fully homomorphic encryption (FHE).

Next, the process 10 includes checking whether a result of the encryption is in a database to determine whether the public key has been previously used (step 18). The database can be a CT log that is checked and updated by a plurality of certificate authorities including a certificate authority implementing the process 10. Again, previously, the CT log only included plaintext public keys. In an embodiment of the present disclosure, the CT log can include entries for both full public keys and encrypted public keys for anonymization purposes. In another embodiment, the CT log can includes entries for only encrypted public keys for anonymization purposes. That is, one possible approach is to store all results in the database with the predetermined one-way function to preserve privacy. It is believed that such an approach may make certificate authorities more willing to participate and update the CT log with their encrypted results. Of note, the encrypted results are for anonymization purposes.

Next, the process 10 includes, responsive to the public key not having been previously used, issuing a certificate to the entity based on the public key and the CSR (step 20). Here, the objective is to ensure uniqueness of the public key, i.e., this public key is only being used for a single certificate. The process 10 can further include, responsive to the public key having been previously used, alerting the entity to resubmit the CSR with a public key that has not been previously used.

Other embodiments are also contemplated, such as allowing multiple certificates with the same public key as there may be some circumstances which this is desirable. For example, the process 10 can include, responsive to the public key having been previously used, inquiring from the entity whether to proceed to issuing the certificate despite previous use.

The process 10 can further include, responsive to the public key not having been previously used, entering a hash of the encryption in the database to denote previous use of the public key based on the issued certificate. Here, the certificate authority performing the process 10 is updating the database since there is a certificate being issued from this CSR, meaning the public key is now associated with a certificate. Of note, the process 10 relies on both checking the database and updating the database, to ultimately ensure public keys are not reused.

As noted above, for all issued certificates, there can be a public hierarchy and a private hierarchy. Here, we note the difference being whether or not the certificate is publicly accessible. Websites with certificates are examples of certificates in the public hierarchy, whereas devices with certificates are example of certificates in the private hierarchy. The process 10 can further include determining the CSR is for a public hierarchy; and, responsive to the public hierarchy, checking whether the public key is in the database to determine whether the public key has been previously used. The process 10 can further include determining the CSR is for a private hierarchy; and, responsive to the private hierarchy, checking whether the result of the encryption is in the database to determine whether the public key has been previously used.

CT Log and Monitoring Thereof

The CT log is a publicly auditable record of TLS/SSL certificate issuance by each Certificate Authority. For example, DigiCert, the applicant of this application, was the first CA to build a CT log that was accepted by Google in 2013. CT Log monitoring is the process of tracking all publicly issued certificates for an organization's domain(s) to ensure that they are authentic and legitimate and have not been compromised by malicious actors. CT Log Monitoring allows organizations to be informed of any attempts to spoof their website by bad actors. In addition, CT logs keep certificate authorities, or CAs, accountable for the certificates they issue. Also, browsers have implemented CT policies where all SSL/TLS certificates are required to have been logged.

CT logs are important because they allow website owners to track all publicly issued certificates for their domain(s) and protect against malicious actors gaining control of the domain. CT logs strengthen the TLS/SSL certificate ecosystem by creating publicly auditable records of certificate issuance. Since 2015, Google has required CAs to log Extended Validation (EV) certificates to public CT logs. In April 2018, Google began requiring CAs to also log Organization Validated (OV) and Domain Validated (DV) certificates to public CT logs. CT logs increase public trust because they account for all public certificates issued by specific Certificate Authorities. In other words, CT logs strengthen the TLS/SSL certificate ecosystem by creating publicly auditable records of certificate issuance.

The CT log monitoring can be via cloud service. Certificate Transparency (CT) is an open framework of logs, monitors, and auditors created to help domain owners oversee digital certificates issued for their brands. CT logs help domain owners protect their brand by providing a way to find mis-issued or rogue certificates issued for their domains more easily. CT log monitoring helps Gain visibility of the SSL/TLS certificates issued for domains with global monitoring and tracking against the public CT logs.

Cut down on time and effort needed to monitor the logs by providing automated checks for issued certificates.

Ensure every certificate issued for your domains is trusted while gaining full oversight of which certificate authority issued each certificate.

CT Log With Encrypted Results

The present disclosure includes updating the CT log framework to include entries with encrypted results, i.e., the public key run through a pre-determined encryption algorithm. The other aspects of the CT log can remain as is, with the update including encryption of the public keys. This preserves privacy and anonymity in the CT logs, allowing certificate authorities and their customers to have confidence in the privacy, allowing expanded participation in the CT log updates, especially for certificates in the private hierarchy.

FHE

Homomorphic encryption is the conversion of data into ciphertext that can be analyzed and worked with as if it were still in its original form. Fully homomorphic encryption (FHE) is the strongest notion of homomorphic encryption. There are various implementations of FHE, any of which is contemplated herewith. Further, there is standards activity as well. A key aspect is all participants predetermine the encryption algorithm. This enables any public key to be added to the CT log and to be checked in the CT log.

Processing System

FIG. 2 is a block diagram of a processing system 100, which may implement any of the devices described herein. The processing system 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 2 depicts the processing system 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example, but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a Central Processing Unit (CPU), an auxiliary processor among several processors associated with the processing system 100, a semiconductor-based microprocessor (in the form of a microchip or chipset), or generally any device for executing software instructions. When the processing system 100 is in operation, the processor 102 is configured to execute software stored within the memory 110, to communicate data to and from the memory 110, and to generally control operations of the processing system 100 pursuant to the software instructions. The I/O interfaces 104 may be used to receive user input from and/or for providing system output to one or more devices or components.

The network interface 106 may be used to enable the processing system 100 to communicate on a network, such as the Internet. The network interface 106 may include, for example, an Ethernet card or adapter or a Wireless Local Area Network (WLAN) card or adapter. The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 108 may incorporate electronic, magnetic, optical, and/or other types of storage media. In one example, the data store 208 may be located internal to the processing system 100, such as, for example, an internal hard drive connected to the local interface 112 in the processing system 100. Additionally, in another embodiment, the data store 108 may be located external to the processing system 100 such as, for example, an external hard drive connected to the I/O interfaces 204 (e.g., SCSI or USB connection). In a further embodiment, the data store 208 may be connected to the processing system 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable Operating System (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Of note, the general architecture of the processing system 100 can define any device described herein. However, the processing system 100 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method of issuing a digital certificate comprising steps of:

receiving a certificate signing request (CSR) from an entity at a certificate authority (CA);

determining a public key of the entity from the CSR;

applying fully homomorphic encryption (FHE) specifically to the public key to generate an encrypted query that preserves anonymity of the public key;

querying a Certificate Transparency (CT) log in a database updated by a plurality of different certificate authorities using the encrypted query to determine whether the public key has been previously used by any of the different certificate authorities;

responsive to the public key not having been previously used, issuing a certificate to the entity based on the public key and the CSR; and responsive to the public key having been previously used, alerting the entity to resubmit the CSR with a public key that has not been previously used.

2. The method of claim 1, wherein the steps further include:

responsive to the public key having been previously used, inquiring from the entity whether to proceed to issuing the certificate despite previous use.

3. The method of claim 1, wherein the steps further include:

responsive to the public key not having been previously used, entering a hash of the encryption in the database to denote previous use of the public key based on the issued certificate.

4. The method of claim 1, wherein the steps further include:

determining the CSR is for a public hierarchy; and responsive to the public hierarchy, checking whether the public key is in the database to determine whether the public key has been previously used.

5. The method of claim 1, wherein the steps further include:

determining the CSR is for a private hierarchy; and responsive to the private hierarchy, performing the querying to determine whether the public key has been previously used.

6. The method of claim 1, wherein the CT log includes entries for both full public keys and encrypted public keys for anonymization purposes.

7. The method of claim 1, wherein the CT log includes entries for only encrypted public keys for anonymization purposes.

8. A non-transitory computer-readable medium comprising instructions that, when executed, cause one or more processors to perform steps of:

receiving a certificate signing request (CSR) from an entity at a certificate authority (CA);

determining a public key of the entity from the CSR;

applying fully homomorphic encryption (FHE) specifically to the public key to generate an encrypted query that preserves anonymity of the public key;

querying a Certificate Transparency (CT) log in a database updated by a plurality of different certificate authorities using the encrypted query to determine whether the public key has been previously used by any of the different certificate authorities;

responsive to the public key not having been previously used, issuing a certificate to the entity based on the public key and the CSR; and responsive to the public key having been previously used, alerting the entity to resubmit the CSR with a public key that has not been previously used.

9. The non-transitory computer-readable medium of claim 8, wherein the steps further include:

responsive to the public key having been previously used, inquiring from the entity whether to proceed to issuing the certificate despite previous use.

10. The non-transitory computer-readable medium of claim 8, wherein the steps further include:

responsive to the public key not having been previously used, entering a hash of the encryption in the database to denote previous use of the public key based on the issued certificate.

11. The non-transitory computer-readable medium of claim 8, wherein the steps further include:

determining the CSR is for a public hierarchy; and responsive to the public hierarchy, checking whether the public key is in the database to determine whether the public key has been previously used.

12. The non-transitory computer-readable medium of claim 8, wherein the steps further include:

determining the CSR is for a private hierarchy; and responsive to the private hierarchy, performing the querying to determine whether the public key has been previously used.

13. The non-transitory computer-readable medium of claim 8, wherein the CT log includes entries for both full public keys and encrypted public keys for anonymization purposes.

14. The non-transitory computer-readable medium of claim 8, wherein the CT log includes entries for only encrypted public keys for anonymization purposes.

* * * * *